Dec. 12, 1950   F. T. CRAWFORD   2,533,357
SUGAR CANE CLEANING METHOD AND APPARATUS
Filed Feb. 20, 1947   4 Sheets-Sheet 1
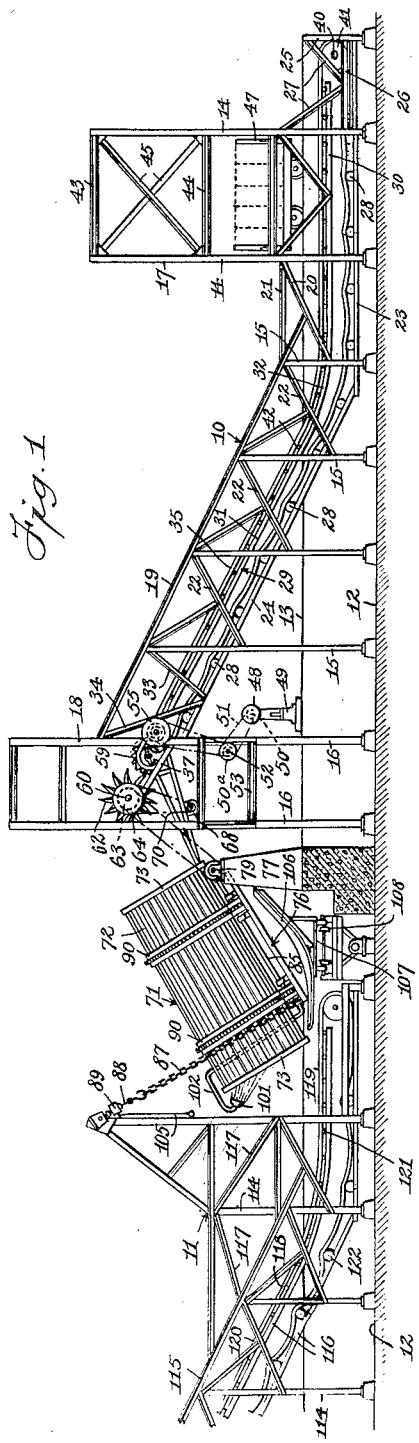
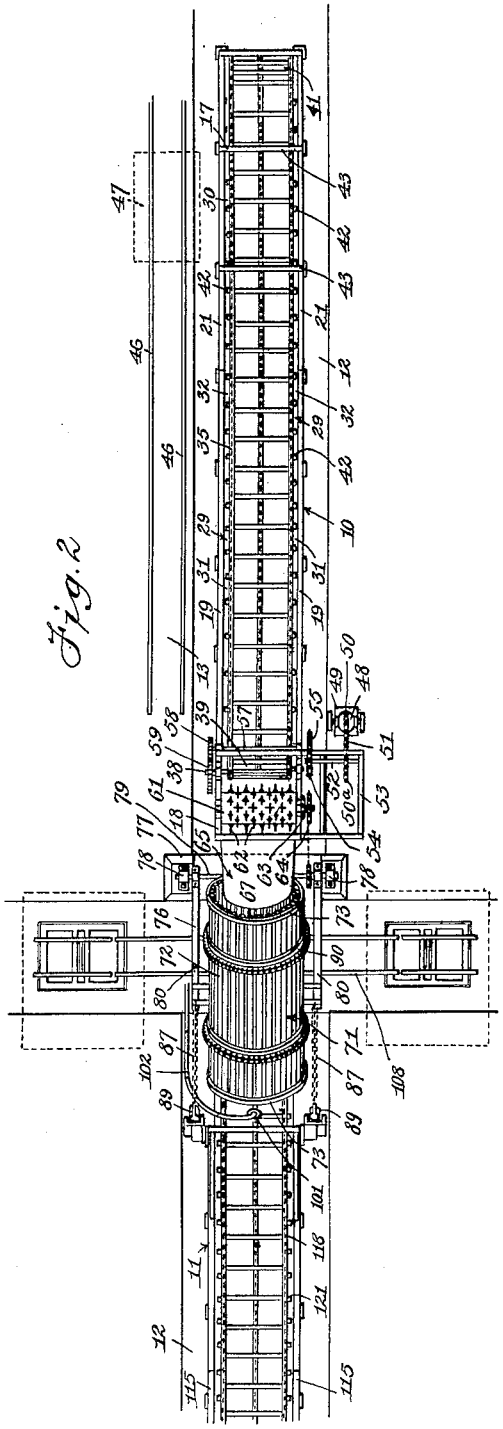
Frank T. Crawford, Inventor
By Emil Neuhart
Attorney.

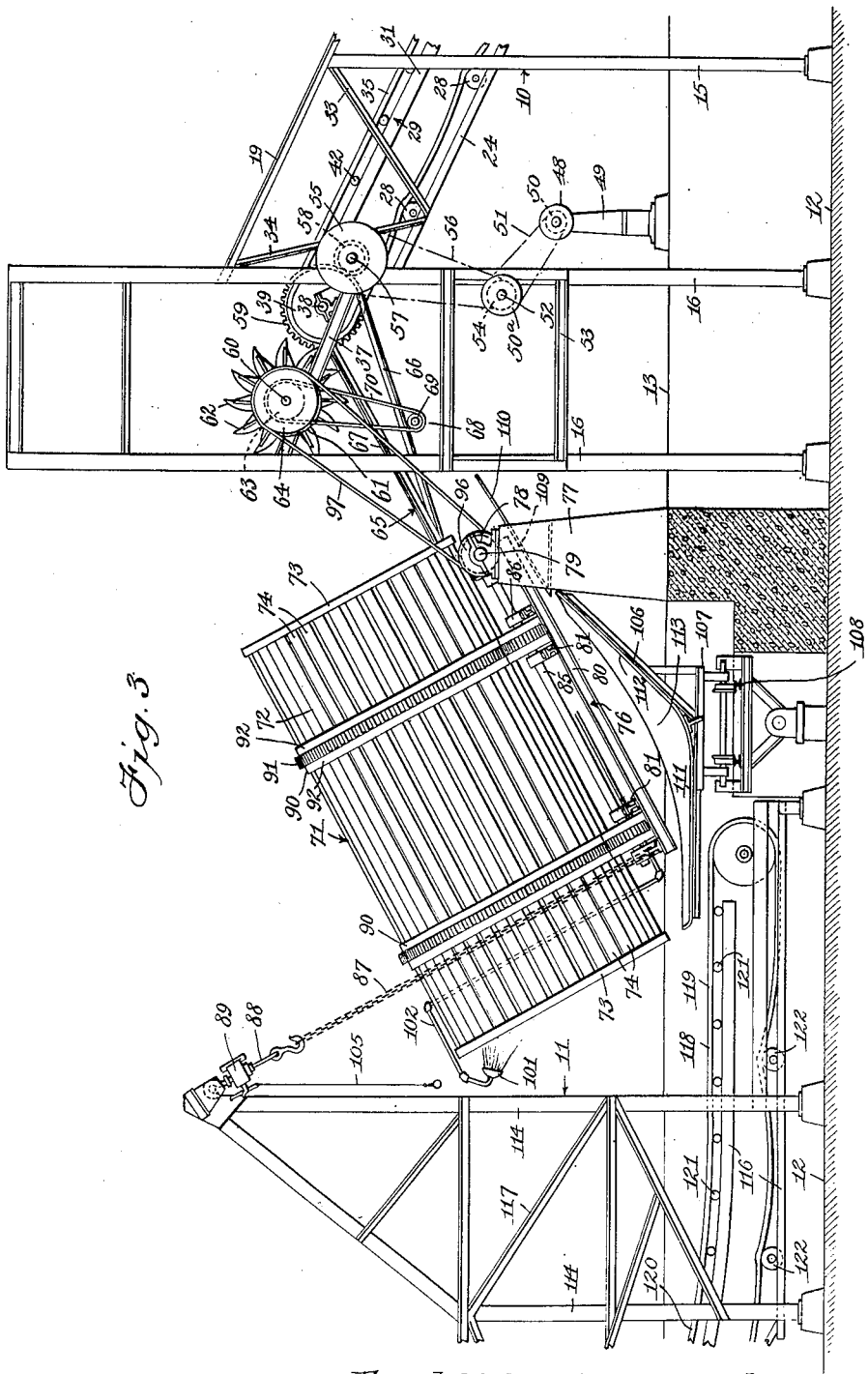

Dec. 12, 1950 — F. T. CRAWFORD — 2,533,357
SUGAR CANE CLEANING METHOD AND APPARATUS
Filed Feb. 20, 1947 — 4 Sheets-Sheet 3
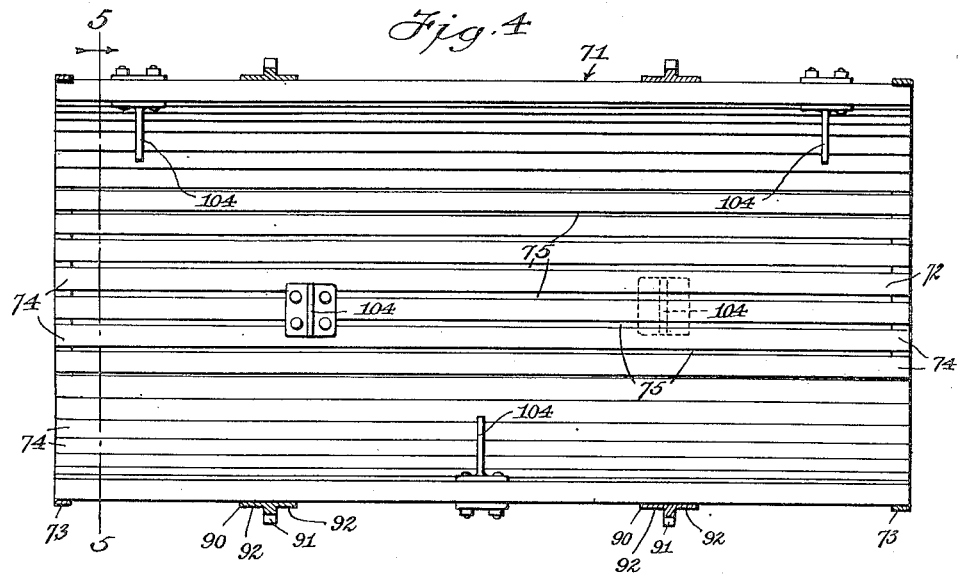
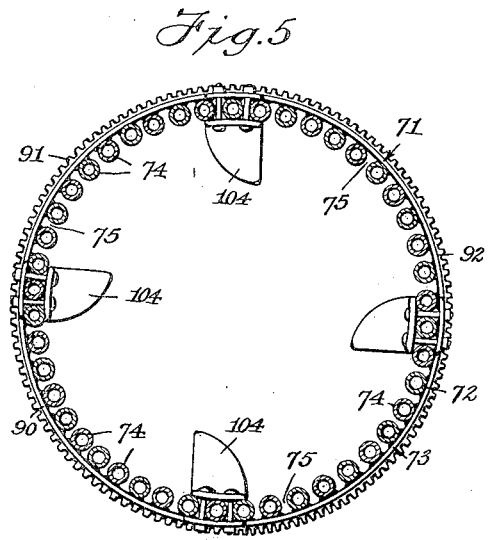
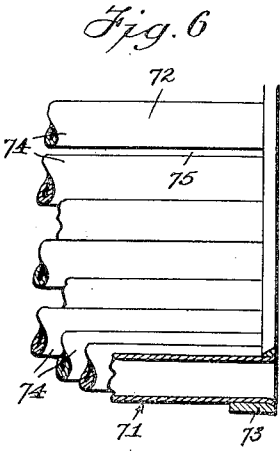
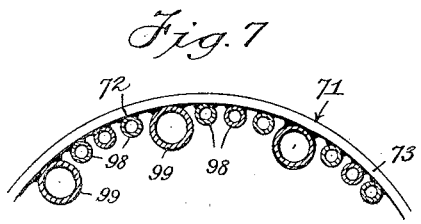
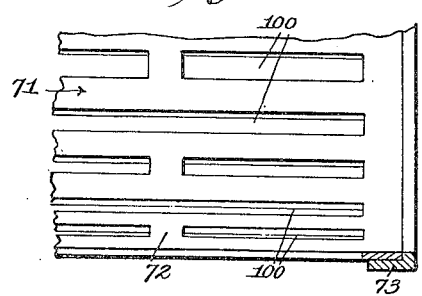
Frank T. Crawford, Inventor
By Emil Hubbard
Attorney.

Dec. 12, 1950   F. T. CRAWFORD   2,533,357
SUGAR CANE CLEANING METHOD AND APPARATUS
Filed Feb. 20, 1947   4 Sheets-Sheet 4
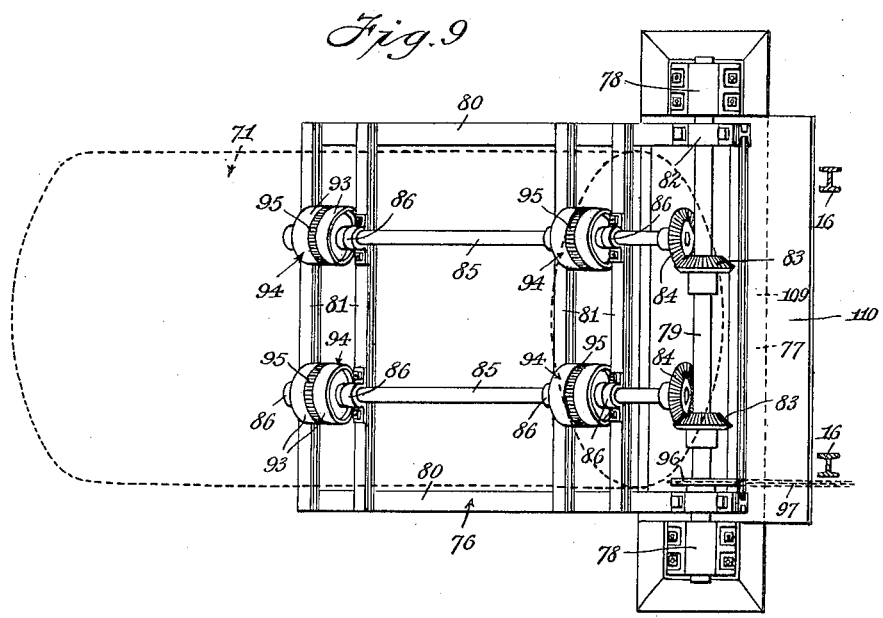
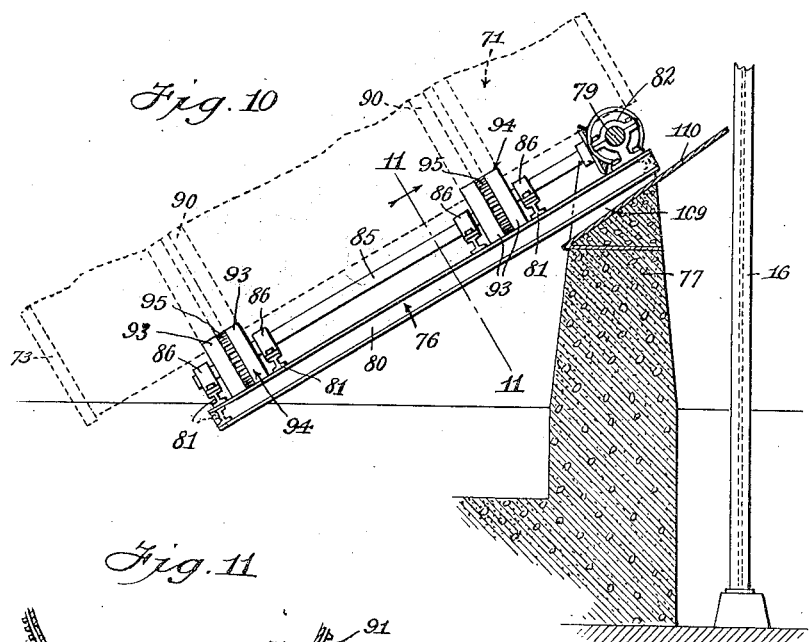
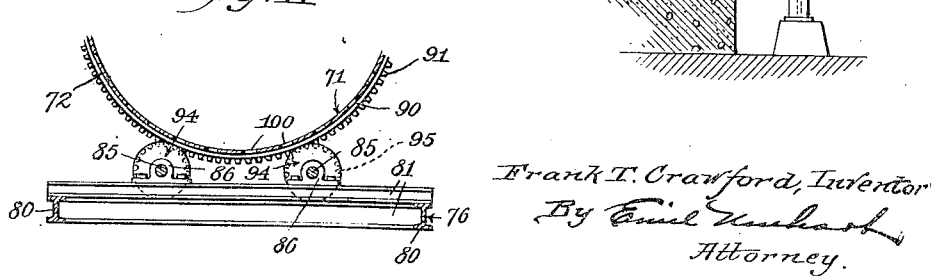
Frank T. Crawford, Inventor
By Emil Neuhart
Attorney.

Patented Dec. 12, 1950

2,533,357

UNITED STATES PATENT OFFICE 2,533,357

SUGAR CANE CLEANING METHOD AND APPARATUS

Frank T. Crawford, Waipahu, Oahu, Territory of Hawaii

Application February 20, 1947, Serial No. 729,838

16 Claims. (Cl. 127—2)

My invention relates to method of and apparatus for cleaning sugar cane and the like preparatory to extracting the juice therefrom under milling operation or otherwise.

In the harvesting of sugar cane, considerable dirt, trash, rubbish and other foreign matter is delivered into the factory or plant with the millable cane. The removal of this foreign matter has been a problem, resulting, under present day methods of removing the foreign and non-yielding matter from the cane, in considerable loss in the production of sugar juices.

It is the prime object of my invention to provide a method and apparatus for freeing the cane from all foreign matter and non-yielding portions of the cane stalks in a manner to eliminate the loss of sugar juices resulting from present day methods of operation.

Another object of my invention is to pass the sugar cane through a drying and separating region in the apparatus, in which the cane stalks are thinned out or segregated, stalk from stalk, and the dirt and other matter entering within the region or adhering to the stalks are separated from the latter without the utilization of moisture, which tends to diminish the yieldable sugar.

Another object of my invention is to apply to the thinned out or segregated cane stalks within the region mentioned, a flame which extends through approximately the entire length of said region and in coming in contact with the sugar cane burns up all trash, rubbish, and non-yielding portions of the cane without injuring the quality of the latter.

A further object is, to provide an apparatus wherein the previously-mentioned objects can be obtained and in which provision is made for regulating the speed of the cane while passing through the thinning out, separating, and trash eliminating region.

With the above and other objects in view to appear hereinafter, my invention consists in the method and in the construction, arrangement, and combination of parts described hereinafter and more particularly pointed out in the subjoined claims.

In the drawings:

Fig. 1 is a side elevation of the apparatus showing an embodiment of my invention designed to carry out my improved method by the use of my improved apparatus.

Fig. 2 is a plan view of the apparatus.

Fig. 3 is an enlarged side elevation of the intermediate portion of the apparatus.

Fig. 4 is a still further enlarged longitudinal section of the open-work drum, the interior of which is utilized as the thinning out and trash segregating and eliminating region of the apparatus, and of the means for drying and/or consuming the trash.

Fig. 5 is a transverse section of the open-work drum taken on line 5—5 of Fig. 4, looking in the direction of the arrow crossing said line.

Fig. 6 is a longitudinal section of a portion of one end of the drum showing a modification in the construction thereof.

Fig. 7 is a cross-section through a portion of the drum showing a further modification thereof.

Fig. 8 is a longitudinal section through a portion of one end of the drum showing a still further modification thereof.

Fig. 9 is a plan view of the drum rotating mechanism and drum-supporting frame on which said mechanism is mounted, the drum being shown in dotted lines in the position in which it is supported by said frame.

Fig. 10 is a side elevation of the drum-supporting frame and the drum rotating mechanism showing the manner of pivotally supporting the same, the drum being shown in dotted lines in the position in which it is supported by said frame.

Fig. 11 is a transverse section taken on line 11—11, Fig. 10, looking in the direction of the arrow crossing said line, the peripheral wall of the drum being formed of sheet metal and slotted to conform to the modification shown in Fig. 8.

Reference being had to the drawings in detail, 10 designates the cane-feeding section of the frame-work supporting the mechanism for feeding cane to a trash consuming and/or segregating and eliminating mechanism, which is interposed between said frame section and a cane-delivery frame section 11. Both sections are supported on a depressed region 12 dug out or otherwise constructed on a level below the normal level or floor 13. The cane-feeding frame section includes uprights 14, 15 and 16, all of which are supported on the bottom of the depressed region 12; the uprights 14, four in number, towering above the uprights 15 which intervene between the uprights 14 and 16 and are gradually increased in height from the uprights 14 to the uprights 16. The latter uprights extend up to a greater height than the uprights 14. The uprights 14 may be said to form a tower 17, while the uprights 16 serve as a tower 18. The various uprights are arranged in pairs at opposite sides of the frame and therefore, the cane-feeding frame may be said to comprise spaced-apart sides. An inclined rail 19, of angle or T-formation in cross section, is riveted, welded or otherwise secured to the upper ends of the uprights 15 at each side of the frame and at their lower ends they are connected with the adjacent uprights 14 through the medium of braces 20, 21, each brace 20 extending downwardly and forwardly beyond the lower end of the inclined rail 19 for connection to the shortest of the uprights 15.

At each side of the frame, brace-irons 22 connect the upper ends of each of the uprights 15, excepting the most forward upright, with the upright 15 next forward thereto. This frame-work may, however, be otherwise constructed so long as it provides means for supporting a cane-feeding carrier-belt designed to receive sugar cane at one end thereof and deliver it at a higher elevation to cane distributing means within the tower 18, to be hereinafter described. Secured to the inner sides of the uprights 14, 15 and to the rear upright 16 at each side of the frame are rails 23 and 24, the rails 23 being horizontally disposed within the depressed region 12 and are parallel with the bottom of said region and with the normal level or floor 13. These rails extend from uprights 25 in rear of and spaced from the uprights 14 at each side of the frame to the shortest upright 15, the uprights 25 being comparatively short and terminating at their upper ends on a level with the normal floor 13. The uprights 25 are also connected with the rear uprights 14 by beams 26 to which are fastened brace-irons 27, one of which at each side of the frame extends from the beam 26 to the upper end of the short upright 25 at the same side of the frame and the other from said beam to the rear upright 14 at said side. From the upper level of the rails 23, the rails 24 are inclined upwardly and their upper ends are welded, riveted or otherwise secured to the rear uprights 16, the lower ends of said rails 24 being welded riveted or otherwise secured to the forward ends of the rails 23. Journaled on the rails 23, 24 are shafts carrying idler rollers or sheaves 28 and arranged above the rails 23 and 24 are weight-carrying rails 29, the latter having horizontal regions 30 parallel with the rails 23, upwardly-inclined regions 31 parallel with the rails 24 and curved regions 32 merging the two mentioned regions. The rearmost uprights 15 have braces 33 connecting them with the rails 24 and between the rear uprights 16 of the tower 18 and the rails 24 additional braces 34 are arranged.

As stated, the uprights 14, 15, and 16 are arranged in pairs spaced apart transversely and connected and braced as specified above, and between these uprights so paired an endless cane-feeding carrier-belt 35 is arranged. In addition to fastening the weight-carrying rails 29 to the inner sides of the spaced-apart paired uprights, they are connected together at intervals by I-beams or other structural irons (not shown). An upwardly and forwardly inclined I-beam 37 connects the two uprights 16 at each side of the frame, the connection being made by riveting, welding or otherwise fastening the I-beam between such uprights and on these transversely spaced-apart beams a shaft 38 is journaled on which a roller 39 is mounted. A shaft 40 is journaled in bearings on the I-beams 26 and on this shaft a roller 41 is mounted. The endless carrier-belt 35 passes around the rollers 39 and 41, the upper strand of said belt moving parallel with the weight-carrying rails 29, while the lower travels in the general direction of the rails 23 and 24. For this purpose rollers 42 are mounted on the weight-carrying rails 29 and support the upper strand of the endless carrier-belt while the lower strand is slackened and travels in contact with the idler rollers or sheaves 28.

The carrier-belt may be of any common construction, such as spaced-apart chains connected with transverse slats, or otherwise, so long as they support the cane delivered thereonto and convey the same to the highest point of the belt. The upper ends of the uprights 14 are connected together by I-beams 43. Additional I-beams 44 connect said uprights 14 together at an intermediate point in the height thereof and brace-irons 45 connect said I-beams and the uprights so as to provide the necessary rigidity for the tower formed by these uprights.

Arranged alongside of the cane-feeding section 10 of the frame-work are the rails 46 of a track, these being on the normal level or floor 13 and parallel with the frame section 10. A loading truck or trucks 47 are designed to be moved along these tracks and are adapted to receive the cane in the form in which it is harvested at a distant point and when moved adjacent the rear and depressed end of the carrier-belt, or conveyor as it may be termed, permits the cane to be conveniently delivered onto said depressed portion with the stalks parallel with the direction in which said belt or conveyor is traveling. In order to cause said belt to travel, an engine or motor 48 is mounted on a pedestal 49 to one side of the highest portion of the belt or conveyor, which motor may, however, be otherwise located and mounted, and on the shaft of the motor a pulley or sprocket-wheel 50 is secured, around which and a pulley or sprocket-wheel 50$^a$, a belt or sprocket-chain 51 is passed, pulley or sprocket-wheel 50$^a$ being secured to a jack-shaft 52 journaled in bearings secured to one of the uprights 16 and to an extension 53 of the frame. On this jack-shaft a second and smaller pulley or sprocket-wheel 54 is secured, around which and a pulley or sprocket-wheel 55 a belt or sprocket-chain 56 is passed; pulley or sprocket-wheel 55 being secured to a shaft 57 journaled in bearings secured to the rear uprights 16, which shaft is provided with a pinion 58 in mesh with a gear-wheel 59 fastened to the shaft 38 on which the roller 41 is mounted. Therefore, upon setting the engine or motor 48 in motion, said roller 41 is rotated so as to cause the cane-feeding carrier-belt or conveyor to travel within the frame section 10 and thus convey the cane delivered onto the lower portion of said belt upwardly into the tower 18 formed by the uprights 16.

Mounted on the I-beams 37 are bearings in which a shaft 60 is journaled, the shaft being parallel with the shaft 38 of the cane-feeding carrier-belt or conveyor and on this shaft is a distributor-reel 61 provided with radially extending fingers or arms 62 spaced-apart longitudinally along said reel in a manner to form a longitudinal series of circular rows of such fingers or arms. On shaft 60 a pulley or sprocket-wheel 63 is secured, also a pulley or sprocket-wheel 64 of larger diameter than the sprocket-wheel 63 and disposed underneath the cane-distributor-reel is a cane-chute 65 comprising a frame 66 formed of angle or other structural iron topped by sheet metal 67, said chute being suitably secured within the tower 18 and extending into the open-work drum, to be hereinafter described, forming a part of the trash consuming and/or segregating mechanism of the apparatus. Carried by this chute is a motor 68 having a pulley or sprocket-wheel 69 secured to the shaft thereof, around which and the pulley or sprocket-wheel 63 on the shaft 60, a belt or sprocket-chain 70 is passed. When delivering the cane from the cane-loading truck or car 47, the stalks thereof assume positions trending generally in the direction in which the cane-feeding belt or conveyor travels, but no provision is made to distribute the cane stalks evenly over the belt until after it reaches the highest point of the belt or conveyor, at which point the cane stalks enter the spaces between the circularly-disposed series of fingers or arms on the distributor-reel 61 and thus are caused to assume positions at right angles to the reel under even distribution transversely of the apparatus or along the length of the distributor-reel and as this reel is rotated, the stalks are delivered onto the cane-chute 65 and from the latter under gravity enters the trash consuming and/or segregating mechanism.

The trash consuming and/or segregating mechanism comprises a drum 71 open at opposite ends and having an open-work peripheral wall 72, the drum being provided with a ring or annulus 73 at each end to which are welded or otherwise secured pipes or tubes 74 separated by spaces 75 through which offal, such as dirt, trash, rubbish or other undesirable matter delivered into the drum, are passed. This drum is inclined rearwardly and provision made for varying the inclination of the same and for this purpose it is supported on a supporting-frame 76 similarly inclined and pivotally supported at its highest point on a transversely-disposed wall 77 rising from the floor or normal level 13. On this wall shaft bearings 78 are mounted and journaled in these bearings is a shaft 79 transversely disposed underneath the drum at its highest elevation.

The supporting-frame 76 comprises longitudinal sills 80 disposed parallel with the axis of the drum and connected by transverse I-beams or members 81 and it has hangers 82 secured to the upper ends of said longitudinal sills which encircle shaft 79 so that the frame may swing on a center provided by said shaft. Bevel gears 83 are secured to shaft 79 and these are in mesh with bevel gears 84 at the upper ends of longitudinally disposed shafts 85 mounted in bearings 86 secured to the I-beams or members 81, said shafts 85 being disposed at opposite sides of a plane passing vertically through the center of the drum 71. The lower end of the frame 76 is anchored to the lower ends of chains 87 extending upwardly and rearwardly at opposite sides of the drum and the upper ends of these chains are connected to cables 88 drawn up or paid-out by electric motors 89 secured to the upper ends of uprights at the forward end of the frame section 11.

Secured to the pipes or tubes 74 of the drum 71 between the rings or annuli 73 are spaced-apart roller annuli 90, each being provided centrally between its edges with a circular series of gear teeth 91 so that smooth roller-bearing surfaces 92 are provided at opposite sides of the gear teeth, which surfaces serve as circular tracks for smooth roller portions 93 formed on rollers 94, keyed or otherwise fastened to the shafts 85, each of said rollers having a circular series of gear teeth 95 which are designed for meshing co-action with the gear teeth on the roller annuli 90. Hereinafter we prefer to refer to the circular series of gear teeth 91 as gear-wheels and to the circular series of gear teeth 95 as pinions and for convenience in description of parts the smooth roller-bearing surfaces 92 of the annuli 90 may be referred to as circular tracks, while the portions of the rollers 94 at opposite sides of the circular series of gear teeth, designated as pinions, may be considered the bearing or supporting rollers. Obviously these parts may be separately constructed and applied instead of the particular integral construction just specified.

The construction described enables the open-work drum to be rotated on the frame 76 and to be swung with the latter by means of the suspending chains 87. In order to rotate the drum, a pulley or sprocket-wheel 96 is secured to shaft 79, around which and the pulley or sprocket-wheel 64 on the shaft of the distributor-reel 61, a belt or sprocket-chain 97 is passed. It will be apparent, therefore, that the drum is rotated indirectly by the motor 68 carried by the cane-chute frame 66.

While I have described and illustrated an open-work drum whose peripheral wall is formed of parallel pipes of like diameter, spaced apart to provide longitudinal spaces or passages therebetween, these pipes may be of varying diameters, such as illustrated in Fig. 7, wherein a plurality of comparatively small pipes 98 are spaced apart and disposed between pipes 99 of larger diameter and spaced from the latter; or if desired openings or slots 100 may be formed in the peripheral wall of the drum by means other than the utilization of pipes or tubes, as shown for example in Fig. 8, wherein the wall is constructed of sheet or boiler metal, the latter being provided with the necessary openings or slots of the dimensions required. While I have described the pipes or tubes forming the peripheral wall of the drum as welded or otherwise secured at their ends within the annuli 73 in Fig. 6, I have illustrated these annuli as circular members constructed of angle-iron and the pipes or tubes fitted and swaged into openings therein.

The purpose of the open-work peripheral wall is to allow the passage therethrough of any dirt, trash, rubbish or any matter foreign to that utilized for extracting juice from the cane stalks and to aid in this I have positioned at a high point at the lower open end of the drum 71 a gas jet or other medium 101 from which a flame is ejected in a manner to cause the flame from the jet or other medium to enter the drum and extend approximately the full length thereof. This jet 101 or other medium may be attached to a combined gas an compressed-air pipe 102 which may be led from any source of gas and air supply and may be supported in any approved manner so as to position and retain the flame ejector in the desired position.

The cane stalks with dirt, trash, rubbish, non-yielding leaves and other matter, are delivered onto the cane-chute 65 by the distributor-reel 61 and from said cane-chute into the drum 71 with the stalks substantially parallel with the axis of the drum. In order to separate or segregate these stalks while passing through the drum and so that each individual stalk may be attacked by the flame directed into the drum, tumbling or agitating paddles or wings 104 are fastened or otherwise arranged within the drum, this being shown only in Figs. 4 and 5, said paddles or wings being spaced apart spirally so that they aid in moving the stalks slowly through the drum. The paddles or wings 104 carry up the sugar-cane stalks to the top of the drum and then release the same so that they drop in separated or segregated form, and therefore the said padddles or wings serve as means to separate or segregate the stalks of corn as they advance through the drum.

The speed with which these stalks are passed through the drum is regulated by the inclination to which the drum is adjusted, it being apparent that the greater the inclination of the drum the more rapidly the passage of the stalks through the same takes place. The wings or paddles serve to lift the stalks within the drum and permit them to drop by gravity so as to cause any adhering matter to be loosened therefrom. During wet weather, wet soil adhering to the cane stalks will become dry during their passage through the drum and any green leaves will also be dried and consumed by the flame issuing from the jet, which may be termed a flame ejector. Any matter not utilized for extracting cane juices from the material passing through the drum will, if not consumed by the flame, find its way through the spaces or openings in the peripheral wall of the drum and be disposed of in a manner to be presently described.

For the purpose of conveniently changing the inclination of the drum 71, the electric motors 89 are each provided with a switch adapted to be actuated by means of a cord 105 depending from the switch and having its lower end within convenient reach of a person standing on the floor or normal level 13, the switches being of a type which will cause the motors to rotate in either direction at will of the attendant so that the chains 87 may be slackened to allow the frame and drum to swing downwardly on the shaft 79 as its center, or to be swung upwardly depending on the direction of rotation of the motor.

The refuse or offal from the cane stalks passing through the drum and escaping through the open-work peripheral wall of the same is delivered into the body 106 of a car 107 arranged for movement on a transversely-disposed track 108 which is on a level beneath the normal level or floor 13 and is disposed in part directly underneath the drum. This track has lateral extensions permitting a car placed underneath the drum to be moved in one direction, while a second car may be placed underneath the drum by moving the same into position from an opposite direction; thus at all times providing a receptacle for reception of the refuse or offal without stopping the operation of the apparatus.

The body portion of the car 107 has a width almost co-extensive with the length of the drum and a length of sufficient dimension to receive all refuse and offal passing through openings in the drum capable of discharging the same at any point in its diameter. The drum 71 does not completely overlie the car, since the uppermost region of the drum overhangs a depressed intermediate portion 109 of the transversely-disposed wall 77 and, therefore, in this depressed portion a fixed inclined chute 110 is arranged which delivers any refuse or offal passing through the peripheral wall of the drum at the upper end thereof onto this chute and from the latter into the body of the car 107.

Transversely the body of the car 107 is of V-formation providing two angular portions 111, 112, the portion 111 being normally horizontally disposed while the portion 112 is inclined upwardly and rearwardly so that when the car is moved underneath the drum 71, the upper or free outer end of the angular portion 112 is positioned underneath the lower end of the chute 110. The body of the car has upstanding-confining or marginal walls 113 to confine the refuse or offal therein.

The frame section 11 is constructed of uprights 114, rails 115, beams 116 and brace-irons 117, all arranged and connected in a manner similar to the frame of the section 10. An endless delivery carrier-belt or conveyor 118 is arranged for travel between the opposite sides of this frame section in the same manner as the cane-feeding carrier-belt or conveyor 35, arranged in the frame section 10. The carrier-belt or conveyor 118 has a horizontal region 119 and an upwardly-inclined region 120 and the upper strand thereof travels over rollers 121 similar to the rollers 42 of the endless feeding carrier-belt or conveyor 35, while the lower strand thereof passes over idlers 122 in a slackened condition similar to the lower strand of said endless feeding carrier-belt or conveyor. The delivery carrier-belt 118 is designed to deliver clean sugar cane, either directly or indirectly, to the mill for extraction of the cane-juice therefrom, as may be desired.

The carrier-belts or conveyors 35 and 118 may be of any approved construction such as transverse slats fastened to spaced-apart chains, properly guided and supported, or any other form of conveyor capable of receiving and carrying cane stalks from one point of the apparatus to another.

The means shown and described for driving the various parts of the apparatus may be otherwise than that herein shown, so long as the speed of the various parts is synchronized to prevent the piling up of cane stalks in any region of their travel.

I particularly wish to stress the importance of utilizing means, such as the drum 71 or other means for thinning out and separating the dirt and other foreign matter from the cane, and the application of a flame to the uncleaned cane stalks, to dry the same when wet, and in any event burn up the trash and rubbish delivered to the apparatus with the cane stalks and to free the stalks of any non-combustible material adhering thereto, without in any manner injuring the cane, and also to segregate the refuse or offal from the stalks in their passage through the apparatus.

I also wish to stress the advantage of regulating the speed at which the stalks are passed through the flame region or passage provided in the apparatus for drying all non-yielding matter adhering to the stalks and for separating and disposing of all matter not considered utilizable for the purpose of extracting cane-juices from the stalks.

I further wish to stress the advantages derived from agitating and separating the stalks, which may be referred to as tumbling, while passing through the flame region so that all portions of each stalk will be attacked by the flame, any moist foreign matter adhering thereto dried, certain kinds of matter adhering thereto fully consumed and other foreign matter and dirt adhering thereto separated therefrom, and finally all refuse and offal disposed of outside of the flame region.

I further wish to cite the advantages resulting from the adjustment of the trash consuming and/or segregating mechanism so as to govern the time required for properly drying wet stalks or stalks having wet adhering matter, and for consuming combustible matter carried through the apparatus from the stalks.

The apparatus shown and described assures the delivery of cane stalks to the mill for extracting juices therefrom in a condition which will prevent a great loss of sugar, and to distinguish my method from other methods now in use in which the cane stalks are subjected to treatment with large quantities of water, I prefer to refer to my method as a dry-cleaning method, under which all sugar will be retained in the cane for extraction at the mill.

It will be apparent from the foregoing that my improved method may be practiced by means other than the particular apparatus herein shown and described and that that my improved apparatus may be modified in various ways without distinguishing from the scope of my invention as set out in the appended claims.

In a broad aspect of my invention, the drum may be considered as an element having a wall surrounding a passage through which sugar cane is adapted to be passed, said wall being provided with escape-openings for the passage therethrough of all non-yielding objects or matter delivered into the passage with or adhering to the cane, or forming part thereof, in association with any means whereby a flame of fire may be directed into said passage, preferably so as to extend to the full length thereof and attack the sugar cane passing therethrough.

Having thus described my invention what I claim is:

1. In a sugar-cane cleaning apparatus, the combination of an elongated inclined enclosure having peripheral offal-discharge openings, an inlet and an outlet for stalks of sugar-cane at opposite ends thereof and serving as a passage for the latter, means within said passage to separate and aid in advancing the traveling movement of said stalks of sugar-cane through said passage, and means at one end of said enclosure to direct a flame of fire into said passage to attack the separated stalks of sugar-cane passing therethrough and free the latter of foreign matter to be passed through said offal discharge openings.

2. In a sugar-cane cleaning apparatus, the combination of an inclined rotatable open-ended drum having a peripheral wall provided with offal-escape openings therein, means for feeding stalks of sugar-cane into one end of said drum, means attached to the inner side of the peripheral wall of said drum to separate and aid in advancing the travel of said stalks of sugar-cane through said drum, and means for directing a flame of fire into said drum from the other end thereof for direct contact with the separated stalks of sugar-cane passing therethrough to consume and/or free undesirable matter adhering to said stalks of sugar-cane, said offal-escape openings allowing the passage of said free undesirable matter therethrough.

3. In a sugar-cane cleaning apparatus, the combination of an inclined rotatable drum having an inlet at its high end and an outlet at its low end and being perforated longitudinally, means for feeding stalks of sugar-cane lengthwise through said inlet into said drum, means fastened to the inner surface of the peripheral wall of said drum for separating and aiding in advancing the stalks of sugar-cane passing through said drum, and means for directing a flame of fire into said drum from its low end so as to attack the separated stalks of sugar-cane passing therethrough, said separating and stalk-advancing means aided by the inclination of said drum serving to deliver the cleaned stalks of sugar-cane through the outlet of said drum and the perforations of said drum serving to discharge the offal from the latter before the cleaned stalks of sugar-cane reach said outlet.

4. In a sugar-cane cleaning apparatus, the combination of an inclined drum having a peripheral wall provided with openings therein, said drum having a sugar-cane inlet at its high end and a cleaned sugar-cane outlet at its low end, means for rotating said drum, means within said drum for separating stalks of the sugar-cane and causing it to be elevated to the top of the drum and drop by gravity during its passage through the latter, and means for directing a flame of fire into the drum in the direction opposite that in which the sugar-cane is passed therethrough.

5. In a sugar-cane cleaning apparatus, the combination of an inclined drum having a peripheral wall provided with openings therein, an inlet at its high end and an outlet at its low end, means for rotating said drum, means within said drum for separating the sugar-cane and causing it to be elevated to the top of the drum and drop by gravity during its passage therethrough, means for changing the inclination of said drum to increase or diminish the speed with which the sugar-cane is being passed through said drum, and means for directing a flame of fire into the drum in the direction opposite that in which the sugar-cane is passed therethrough, said flame contacting the sugar-cane to dry moistened parts of the same and moist foreign matter adhering thereto, to dry and remove said foreign matter from the sugar-cane and to consume all plant matter not intended for milling purposes.

6. In a sugar-cane cleaning apparatus, the combination of a conveyor adapted to receive thereon and feed sugar-cane in stalk form, an inclined open-ended rotatable drum receiving the stalks of sugar-cane through its upper open end, said drum having its peripheral wall constructed to pass offal therethrough, means attached to the inner peripheral surface of said drum to segregate the stalks of sugar-cane supplied thereto by said conveyor and aid in advancing the said stalks of sugar-cane through said drum so as to deliver said stalks from its lowest end, a flame ejecting means at the lower end of said drum adapted to direct a flame of fire against the sugar-cane passing therethrough in segregated form so as to attack combustible trash and foliage adhering to the stalks of sugar-cane and separate the trash and foliage therefrom, and a delivery conveyor receiving the cleaned stalks of sugar-cane from said drum for delivery to a mill adapted to extract the sugar from the cleaned stalks of sugar-cane.

7. In an apparatus for cleaning sugar-cane, cane-feeding conveyor mechanism adapted to receive sugar-cane as harvested at one end thereof, distributing mechanism at the other end of said mechanism to receive and distribute the cane discharged from said feeding mechanism, an open-ended downwardly-inclined drum having a peripheral wall provided with openings therein and receiving the cane at its upper end from said distributing mechanism, means for rotating said drum, a flame ejector disposed to direct a flame into and along the length of said drum to attack the sugar-cane passing through the latter, and delivery conveyor mechanism receiving the cane from said drum and delivering it for use in cleaned condition for further manipulation.

8. In an apparatus for cleaning stalks of sugar-cane, the combination of an elongated cane-feeding conveyor-mechanism having a low receiving region and an inclined portion extending upwardly from said receiving region, a track disposed at one side of said conveyor-mechanism over which a vehicle is to be passed enabling stalks of sugar-cane loaded thereon to be delivered to the low receiving region of said cane-feeding conveyor mechanism, an oppositely inclined cleaning drum having an inlet for stalks of sugar-cane at its high end and an outlet for the stalks of sugar-cane at its low end and having also a peripheral wall provided with openings for the discharge of offal from the stalks of sugar-cane, means for rotating said drum, means within said drum for separating the stalks of sugar-cane delivered thereinto and advancing the same at least along regions thereof through said drum in separated condition, a flame ejector at the outlet end of said drum adapted to eject a flame into said drum in the direction of its length and in a direction contrary to that of the advancing movement of the stalks of sugar-cane passing through said drum, means interposed between the discharge end of said feeding-conveyor mechanism and the high end of said drum to deliver stalks of sugar-cane lengthwise into the inlet thereof, and delivery conveyor mechanism having a low region onto which the cleaned cane is delivered, said delivery conveyor mechanism having a portion inclined upwardly from its low region to deliver the cleaned sugar-cane at a high elevation.

9. In an apparatus for cleaning sugar-cane preparatory to extracting the sugar juice therefrom, the combination of an open-ended drum adapted to receive sugar-cane at one end thereof and discharge the same from its other end, means within said drum to tumble the sugar-cane in stalk form so as to separate the stalks of cane while passing through said drum, cane-distributing means at the receiving end of said drum serving to position the sugar-cane substantially parallel with the length of said drum, means to feed the sugar-cane to said distributing means, and means at the discharge end of said drum for directing a flame of fire thereinto in a direction opposite that of the passage of the sugar-cane therethrough.

10. In combination, an inclined rotatable element having a wall surrounding a passage through which stalks of sugar-cane to be cleaned are adapted to be passed and having said wall perforated longitudinally, means to carry up the stalks of sugar-cane to the top of said passage while traveling therethrough and to release said stalks so that they drop in segregated form to the bottom of said passage, and means at one end of said passage to direct a flame of fire thereinto to attack the stalks of sugar-cane while passing therethrough and consume and/or free undesirable matter therefrom.

11. In combination, an element having a wall surrounding a passage through which stalks of sugar-cane to be cleaned are adapted to be passed and having offal-escape openings therein, means to agitate the cane in its travel through said passage so as to separate the stalks of cane, and means to direct a flame of fire into said passage in a direction opposite that in which the cane is traveling therethrough.

12. In combination, an inclined rotatable open-ended drum having a peripheral wall formed of a circular series of spaced-apart tubes providing offal openings between said tubes from end to end of said drum, means to deliver stalks of sugar-cane into the upper end of said drum, means to deliver said stalks of sugar-cane from the lower end of said drum, means secured to the interior of said wall to cause the stalks of cane to be elevated within said drum and drop freely in segregated form to the bottom thereof under advancing movement through said drum during rotation of the latter and means to direct a flame of fire into said drum to directly attack the stalks of sugar-cane while in segregated form and thus impinge against greater areas of such stalks.

13. In combination, an inclined rotatable drum having offal-discharge openings in its peripheral wall and through which stalks of sugar-cane are adapted to be passed, means for varying the inclination of said drum, means secured to the inner side of said wall to separate the stalks of sugar-cane and to aid in loosening foreign and other non-yielding matter therefrom during the rotation of said drum, and means to direct a flame of fire into said drum in a reverse direction to that of the passage of the stalks of sugar-cane therethrough to attack the sugar-cane and consume combustible portions of such matter.

14. In an apparatus for dry-cleaning sugar-cane, the combination of an elongated inclined foraminous element along which stalks of sugar-cane are carried and through the openings of which offal is passed, means to tumble said stalks of sugar-cane above the openings in said foraminous element to cause said stalks to be separated while being carried along said foraminous element, and means to direct a flame of fire against the sugar-cane so carried and separated, said foraminous element delivering the sugar-cane separate from the offal after so treating the sugar-cane.

15. In an apparatus for dry-cleaning sugar-cane, the combination of an inclined foraminous element along which sugar-cane is carried, means to move said foraminous element to cause the stalks of sugar-cane to be carried along said foraminous element and separated while carried along the latter, and means to direct a flame of fire against the stalks of sugar-cane while being separated so as to consume combustible matter adhering to the sugar-cane and to separate non-combustible matter therefrom and cause the latter to disintegrate and be delivered through the openings in said foraminous element, the latter having a sugar-cane discharge at its lower end to deliver the cleaned sugar-cane therefrom separate from the non-combustible material passed through the openings in said foraminous element.

16. In a sugar-cane cleaning apparatus, the combination of a rotatable elongated enclosure having a sugar-cane passage therethrough provided with an inlet at one end and an outlet at its other end and provided further with offal-discharge openings in its peripheral wall, means to distribute and arrange stalks of sugar-cane in substantial parallelism preparatory to entering the same in said passage through said inlet, means to separate said stalks of sugar-cane within said passage and advance the same therethrough for delivery through said outlet, and means at the outlet end of said passage to direct a flame of fire into said passage to attack the separated stalks of sugar-cane passing therethrough and clean the latter, said offal-discharge openings serving to pass offal freed from said sugar-cane to a region outside of said rotatable enclosure separate from that of the delivery of cleaned sugar-cane therefrom.

FRANK T. CRAWFORD.

REFERENCES CITED

The following references are of record in the file of this patent:

UNITED STATES PATENTS

| Number | Name | Date |
|---|---|---|
| 354,510 | Hughes | Dec. 14, 1886 |
| 428,439 | Adamson | May 20, 1890 |
| 854,342 | Enright | May 21, 1907 |
| 1,469,744 | Wessale | Oct. 2, 1923 |
| 1,990,250 | Pitcher | Feb. 5, 1935 |
| 2,243,192 | Clark | May 27, 1941 |